United States Patent
Agafonov et al.

(10) Patent No.: US 11,075,879 B1
(45) Date of Patent: Jul. 27, 2021

(54) APPARATUS AND METHOD FOR MAC ADDRESS OVERRIDE FOR ETHERNET ADAPTERS

(71) Applicant: Aquantia Corporation, San Jose, CA (US)

(72) Inventors: Roman Agafonov, Novgorod (RU); Kirill Pryadko, Novgorod (RU)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/537,008

(22) Filed: Aug. 9, 2019

Related U.S. Application Data

(60) Provisional application No. 62/718,909, filed on Aug. 14, 2018.

(51) Int. Cl.
*H04L 29/12* (2006.01)
*G06F 1/16* (2006.01)

(52) U.S. Cl.
CPC ...... *H04L 61/2038* (2013.01); *H04L 61/6022* (2013.01); *G06F 1/1632* (2013.01)

(58) Field of Classification Search
CPC ............ H04L 61/2038; H04L 61/6022; G06F 1/1632
See application file for complete search history.

(56) References Cited

U.S. PATENT DOCUMENTS

| | | | |
|---|---|---|---|
| 10,091,826 B2 * | 10/2018 | Dees | H04W 76/12 |
| 2010/0027444 A1 * | 2/2010 | Lin | H04L 65/1069 370/254 |
| 2016/0036767 A1 * | 2/2016 | Gillon | H04L 61/2038 709/226 |
| 2017/0272378 A1 * | 9/2017 | Huang | H04L 47/70 |
| 2019/0173582 A1 * | 6/2019 | Ashrafi | H01Q 25/005 |

FOREIGN PATENT DOCUMENTS

WO   WO-2016087320 A1 *  6/2016 ........... H04L 7/0008

\* cited by examiner

*Primary Examiner* — Uzma Alam

(57) ABSTRACT

A computer-implemented method for running on a computing device is disclosed. The computer-implemented method includes detecting an initialization sequence triggered by a network interface event. A request is received to load a non-local MAC address into local register storage associated with the computing device. The request is intercepted, and a local MAC address corresponding to the computing device is substituted into the local register storage.

15 Claims, 2 Drawing Sheets

APPARATUS AND METHOD FOR MAC ADDRESS OVERRIDE FOR ETHERNET ADAPTERS

RELATED APPLICATION(S)

This application claims benefit of priority to Provisional U.S. Patent Application No. 62/718,909, titled "APPARATUS AND METHOD FOR MAC ADDRESS OVERRIDE FOR ETHERNET ADAPTERS", filed Aug. 14, 2018, the aforementioned priority application being hereby incorporated by reference in its entirety.

TECHNICAL FIELD

The disclosure herein relates to communications systems, and more specifically to high-speed networking systems and methods.

BACKGROUND

Network communications between computing devices typically involve identifying each computing device with a "hardware" address known as a Media Access Control (MAC) address. The MAC address is often tied to a Network Interface Card (NIC) that enables a given computer to communicate with a given network. Consequently, where IP addresses are generally associated with TCP/IP (networking software), MAC addresses are generally linked to network adapter hardware.

In many situations, mobile device users may dock or interface one or more mobile devices with a docking station. Docking stations typically include a NIC. Thus, when a given computing device is docked with the station, the MAC address utilized for purposes of network communications is that of the docking station NIC. This is typically the case even where a mobile device includes its own NIC.

For a variety of reasons, it would be desirable to utilize the unique MAC address of a given mobile device, rather than a docking station NIC, when docked and accessing a given network.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Methods and apparatus for networking systems, apparatus and associated methods are disclosed. In one embodiment, a computer-implemented method for running on a computing device is disclosed. The computer-implemented method includes detecting an initialization sequence triggered by a network interface event. A request is received to load a non-local MAC address into local register storage associated with the computing device. The request is intercepted, and a local MAC address corresponding to the computing device is substituted into the local register storage.

Figure 1:
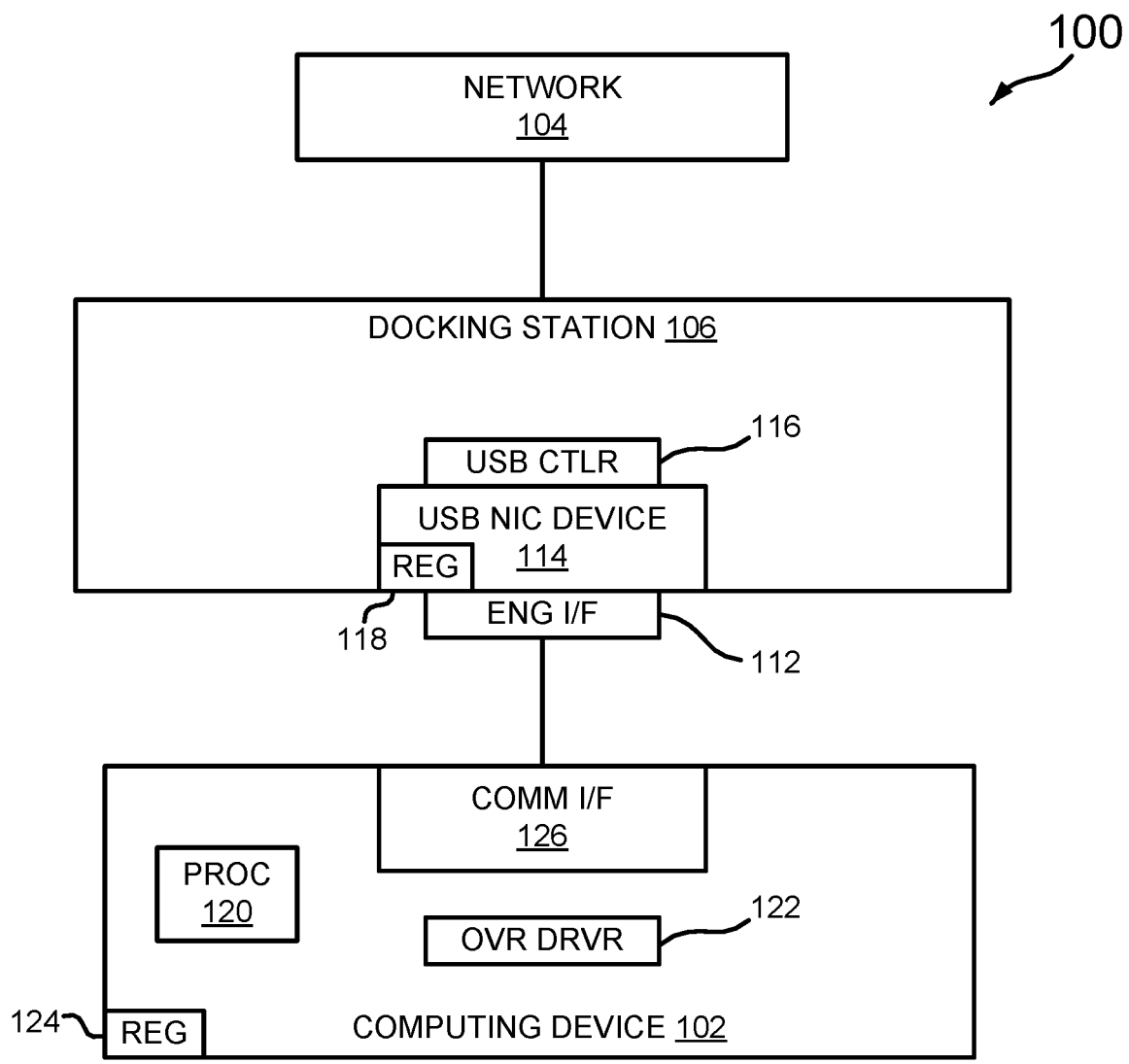
FIG. 1 illustrates one embodiment of a mobile device interfaced with a network via a docking station.

Referring now to FIG. 1, one embodiment for a network node, generally designated 100, includes a mobile device 102 that interfaces with an externally-accessible network 104, via a network device such as a docking station 106. The docking station generally enables the computing device to access the network in a wired or wireless fashion via a suitable network communications protocol, such as Ethernet.

In one embodiment, and still referring to FIG. 1, the docking station includes an engagement interface 112 for coupling to the computing device 102. In some embodiments, the engagement interface 112 provides for coupling to multiple computing devices. The docking station includes a NIC device 114, such as a USB NIC device that may be controlled by a USB controller 116. A MAC address associated with the USB NIC device is stored in register circuitry 118. During an initialization sequence following docking of a computing device to the docking station, a NIC driver sends a request to the computing device, along with the NIC MAC address, for loading into the computing device 102.

Further referring to FIG. 1, the mobile device 102 may take the form of a mobile computing device such as a laptop, tablet, or telephone. For one embodiment, the mobile device 102 employs a general purpose processor 120 that generally executes a variety of software applications, including the NIC driver, and a local MAC address override driver 122 (located between the NIC driver and a communications interface 126). Register storage 124 stores a unique MAC address associated with the computing device 102. The communications interface 126 provides connectivity to the docking station 106. The interface 126 generally meets and/or exceeds standardized features associated with, for example, the Universal Serial Bus SuperSpeed standard, USB legacy standards, one or more high-speed Ethernet standards, and so forth.

With continued reference to FIG. 1, the MAC address override driver 122 generally provides a way to detect when a MAC address other than the NIC's MAC address is requested for use in network communications involving the computing device. This is precisely the situation that takes place during a docking initialization. When such an occurrence is detected, the override driver intercepts the request and substitutes the NIC's MAC address for the local computing device's MAC address. The MAC address override carried out by the override driver thus maintains a level of unique personalization associated with the given computing device when communicating with other devices in the network via the docking station.

Figure 2:
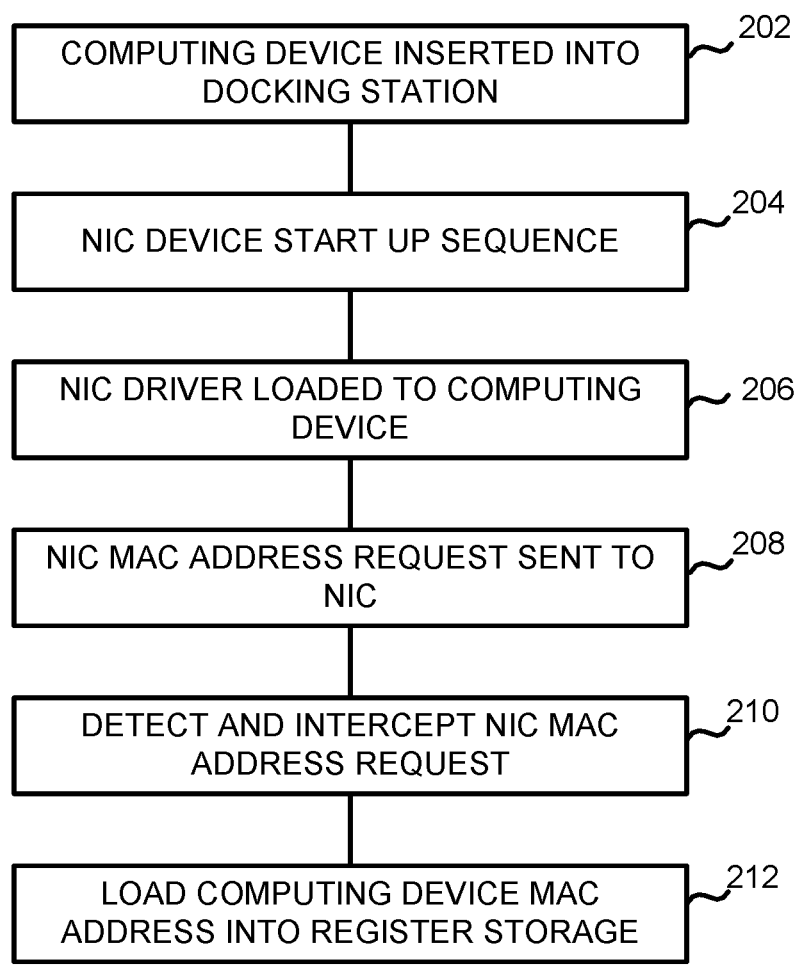
FIG. 2 illustrates one embodiment of a method of operation carried out by a computing device driver to utilize a MAC address associated with a given computing device when docked to a docking station.

FIG. 2 illustrates further detail of one embodiment of steps employed during operation of the networking system of FIG. 1 involving the override driver. In operation, a user desiring to establish a network connection may connect a given computing device to a suitable adapter port on the docking station, such as at 202. The connection may be viewed as a network interface event. Circuitry in the USB controller detects the network interface event and operates in accordance with an initialization procedure, or NIC device startup sequence, at 204. As part of the startup sequence, a NIC driver is loaded to the computing device, at 206. The NIC driver then sends a request to load the docking station NIC MAC address into local register storage residing on the computing device, at 208. The request is detected and intercepted by the locally-running override driver, at 210, which substitutes the local computing device MAC address into the register storage, at 212.

Following the startup sequence, data transfers involving the computing device will reflect the MAC address of the computing device itself, rather than the MAC address of the docking station NIC. This may be especially beneficial for gaming and enterprise applications, where multiple users may be docked to a common docking station. The unique MAC addresses of all of the user computing devices docked to the single docking station will then be reflected in the various data streams, rather than a single NIC MAC address of the docking station.

Those skilled in the art will appreciate that the embodiments described above enhance a mobile device's "personalization" by enabling preserving use of the mobile device's local MAC address, rather than accepting use of a remote docking station NIC MAC address. Such advantages increase a user's experience, especially in circumstances where multiple computing devices are docked to a common docking station.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "l" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A computer implemented method for running on a computing device that is disposed on a computer network in which data transfers between the computing device and the computer network, the computing device identifiable by a local MAC address, the computer implemented method comprising:
    detecting an initialization sequence triggered by a network interface event when the computing device access the computer network via a network device;
    detecting receipt, by the computing device, of a request to load a non-local Media Access Control (MAC) address associated with the network device into a local register storage located on the computing device;
    intercepting the request;
    substituting the local MAC address corresponding to the computing device for loading into the local register storage in place of the non-local MAC address in the intercepted request.

2. The computer-implemented method according to claim 1, wherein the detecting an initialization sequence triggered by a network interlace event when the computing device accesses a network via a network device comprises:
    detecting an initialization sequence triggered by a network interface event when the computing device accesses a network via a docking station.

3. The computer-implemented method according to claim 2, wherein detecting receipt, by the computing device, of a request to load a non-local Media Access Control (MAC) address comprises:
    detecting receipt, by the computing device, of a request to load a Network Interface Card (NIC) MAC Address uniquely identifying the docking station.

4. The computer-implemented method according to claim 1, wherein detecting receipt, by the computing device, of a request to load a non-local Media Access Control (MAC) address associated with the network device into local register storage associated with the computing device further comprises: determining that the non-local MAC address fails to match the local MAC address.

5. A computing device that is identifiable on a computer network by a local MAC address, the computing device comprising:
  a communications interface configured to access the computer network via a network device, the network device being associated with a non-local MAC address that is not local to the computing device;
  a storage unit configured to store MAC addresses;
  a processor;
  a local MAC address override driver configured, in response to the communications interface receiving a request to load the non-local MAC address into the storage unit, to provide instructions to the processor to substitute the local MAC address identifying the computing device into the storage in place of the non-local MAC address associated with the network device.

6. The computing device according to claim 5, wherein the network device comprises:
  a docking station.

7. The computing device according to claim 6, wherein the non-local MAC address comprises:
  a Network Interface Card (NIC) MAC Address uniquely identifying the docking station on the computer network.

8. The computing device according to claim 5, wherein the communications interface comprises:
  an Ethernet interface including an Ethernet MAC and an Ethernet PHY.

9. The computing device according to claim 5, wherein the local MAC address override driver provides further instructions to the processor to:
  intercept the request before the non-local MAC address is loaded into the storage.

10. The computing device according to claim 9, wherein the local MAC address override driver provides further instructions to the processor to:
  determine whether the non-local MAC address fails to match the local MAC address.

11. A network node for accessing a computer network, the network node comprising:
  a network device identifiable by a first MAC address;
  a first computing device coupled to the computer network via the network device, the first computing device identifiable on the computer network by a first local MAC address, the first computing device including
    a communications interface configured to access the computer network via the network device,
    a first storage unit configured to store MAC addresses,
    a processor, and
    a MAC address override driver configured, in response to the communications interface receiving a request to load the first MAC address into the first storage unite to provide instructions to the processor to substitute the local first local MAC address identifying the first computing device into the first storage until in place of the first MAC address associated with the network device.

12. The network node according to claim 11, wherein the network device comprises:
  a docking station.

13. The network node according to claim 12, wherein the docking station comprises:
  a first engagement interface to receive the communications interface of the first computing device.

14. The network node according to claim 13, further comprising:
  a second computing device identifiable by a second local MAC address, the second device including
    a second communications interface,
  wherein the docking station includes a second engagement interface to receive the second communications interface of the second computing device.

15. The network node according to claim 14, wherein the second computing device further comprises:
  a second processor;
  a second storage unit to store MAC addresses; and
  a second MAC address override driver configured, in response to the second communications interface receiving a request to load the first MAC address into the second storage unit, to provide instructions to the processor to substitute the second local MAC address identifying the second computing device into the second storage unit in place of the first MAC address associated with the network device.

\* \* \* \* \*